US009565400B1

(12) United States Patent  
Curlander et al.

(10) Patent No.: US 9,565,400 B1  
(45) Date of Patent: Feb. 7, 2017

(54) AUTOMATIC IMAGING DEVICE SELECTION FOR VIDEO ANALYTICS

(71) Applicant: Amazon Technologies, Inc., Reno, NV (US)

(72) Inventors: James Christopher Curlander, Mercer Island, WA (US); Jules Cook Graybill, Seattle, WA (US); Michael Anthony Molello, Poulsbo, WA (US)

(73) Assignee: Amazon Technologies, Inc., Seattle, WA (US)

( * ) Notice: Subject to any disclaimer, the term of this patent is extended or adjusted under 35 U.S.C. 154(b) by 634 days.

(21) Appl. No.: 14/137,973

(22) Filed: Dec. 20, 2013

(51) Int. Cl.
| H04N 7/18 | (2006.01) |
| G06T 7/00 | (2006.01) |
| G06K 9/00 | (2006.01) |
| G08B 13/196 | (2006.01) |
| G01C 11/02 | (2006.01) |

(52) U.S. Cl.
CPC .......... H04N 7/181 (2013.01); G06K 9/00771 (2013.01); G06T 7/004 (2013.01); G08B 13/19641 (2013.01); H04N 7/188 (2013.01)

(58) Field of Classification Search
CPC .......... H04N 7/181; H04N 7/183; H04N 7/18; H04N 7/188; H04N 7/005; G08B 13/19656; G01C 11/025; G01C 11/02
See application file for complete search history.

(56) References Cited

U.S. PATENT DOCUMENTS

| 9,247,216 B2 * | 1/2016 | Hazzani | G08B 13/19645 |
| 2005/0058321 A1 * | 3/2005 | Buehler | G06K 9/00771 |
| | | | 382/103 |
| 2006/0004579 A1 * | 1/2006 | Claudatos | G08B 13/1672 |
| | | | 704/270 |
| 2006/0004580 A1 * | 1/2006 | Claudatos | G08B 13/1672 |
| | | | 704/275 |
| 2006/0004581 A1 * | 1/2006 | Claudatos | G08B 13/1672 |
| | | | 704/275 |
| 2007/0035627 A1 * | 2/2007 | Cleary | G08B 13/19608 |
| | | | 348/159 |
| 2010/0013931 A1 * | 1/2010 | Golan | G06K 9/00771 |
| | | | 348/150 |
| 2011/0069172 A1 * | 3/2011 | Hazzani | G08B 13/19645 |
| | | | 348/159 |
| 2011/0069173 A1 * | 3/2011 | Hazzani | G08B 13/19608 |
| | | | 348/159 |

* cited by examiner

Primary Examiner — Sath V Perungavoor  
Assistant Examiner — Howard D Brown, Jr.  
(74) Attorney, Agent, or Firm — Athorus, PLLC

(57) ABSTRACT

A suitable imaging device for capturing images of an object or an area of interest may be automatically selected based on information regarding the locations and/or other operational properties of a plurality of imaging devices, and a location of the object or the area of interest. One or more geometric models of the fields of view of the imaging devices may be generated, and whether the object or the area of interest falls within one or more of the fields of view may be determined using such models. Where multiple imaging devices may include the object or the area of interest, within a field of view, the imaging device having the most suitable image, e.g., the largest or highest resolution image of the object or the area of interest, may be selected.

22 Claims, 9 Drawing Sheets

AUTOMATIC IMAGING DEVICE SELECTION FOR VIDEO ANALYTICS

BACKGROUND

Video cameras are frequently used for the purpose of conducting surveillance or monitoring operations. Such cameras may be aligned to capture images of actions or events within their respective fields of view, and information regarding the captured images or the actions or events may be recorded and subjected to further analysis in order to identify aspects, elements or features of the content expressed therein. For this purpose, video cameras may be provided alone or in groups, and may be programmed to recognize when an action or event has occurred, such as when a frame-to-frame analysis of video imagery suggests that a predetermined threshold has been exceeded or that a predetermined condition has been satisfied, or when the analysis otherwise implies the occurrence of the action or the event based on information captured by the cameras.

Typically, when a group or array of cameras is provided for the purpose of conducting an analysis of the content expressed in one or more still or moving images, one of the video cameras of the group or array is manually selected. Next, an area of interest in a field of view of the camera is identified. Such an area may constitute some or all of the pixels of the field of view. Finally, an activity that may occur within the field of view may be identified according to one or more content-based analyses.

The process of selecting one or more of a plurality of cameras for conducting video analytics for a specific purpose can be complicated by geographic considerations and real-world constraints. For example, without conducting extensive trial-and-error analyses, or individually evaluating the suitability of each of the cameras for the specific purpose, there is currently no way to discern which of the plurality of cameras would provide the best or most advantageous views with regard to the specific purpose. Particularly in time-critical situations or in ever-changing environments, current systems and methods for identifying appropriate cameras for conducting video analytics are inadequate in this regard. Additionally, no such systems or methods may be applied forensically, that is, to determine which of a plurality of cameras may have captured information regarding an event of interest that has already occurred. Rather, the information captured by each of the plurality of cameras must be individually evaluated in order to determine whether one or more of the cameras recorded information regarding the event of interest, or to evaluate the quality of such information.

DETAILED DESCRIPTION

As is set forth in greater detail below, the present disclosure is directed to the automatic selection of imaging devices such as cameras for use in content-based analytics. Specifically, the systems and methods are directed to determining the geographic locations and operational properties (e.g., orientations, attributes or capacities) of a plurality of imaging devices, as well as a geographic location of one or more areas or objects of interest. Upon calculating or otherwise determining a field of view or other coverage zone associated with the plurality of devices, the systems and methods disclosed herein may determine not only how many of the plurality of devices may provide views of the areas or objects of interest but also which of the plurality of devices provides a superior or preferred view. Once an imaging device or devices having the areas or objects of interest in fields of view have been identified, the content of the images captured by such devices may be analyzed to determine whether one or more such images indicate that an item is present, or that a condition, a status or an event has occurred, according to any given triggering events or metrics, or other relevant thresholds. Such triggering events, metrics, or thresholds may be associated with a recognition of a particular item or object within a field of view of an imaging device, or a movement by one or more items or objects within the field of view, or any other visually perceptible thing or action.

The analyses disclosed herein may be provided in real time, or in near-real time, with regard to the ongoing operation of a plurality of imaging devices (e.g., cameras), i.e., to identify which imaging device may have a suitable or appropriate view of an area or an object of interest. Alternatively, such analyses may be provided forensically, i.e., in retrospect, or after the fact, with regard to the operation of the plurality of imaging devices, and may be used to determine one or more of such imaging devices to capture still or moving images of the area or the object of interest.

Figure 1B:
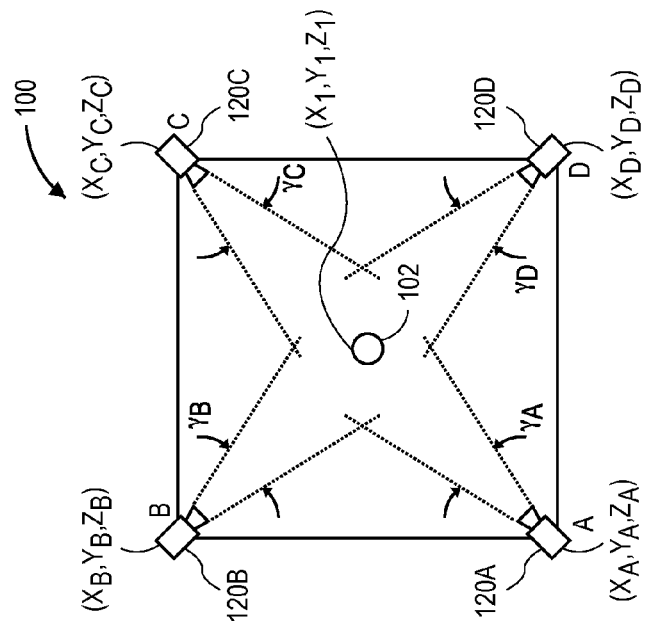
FIGS. 1A, 1B, 1C, 1D and 1E are views of components of one system for automatically selecting imaging devices for video analytics, in accordance with embodiments of the present disclosure.
Figure 1A:
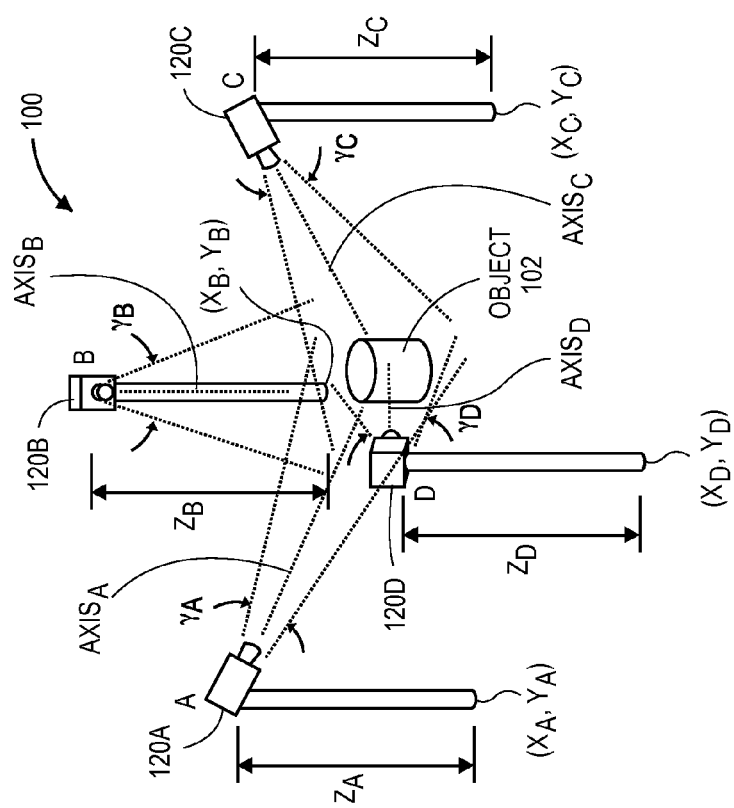

Referring to FIGS. 1A, 1B, 1C, 1D and 1E, views of components of one system 100 for automatically selecting imaging devices for video analytics in accordance with embodiments of the present disclosure are shown. The system 100 includes an object 102 within fields of view of four imaging devices 120A, 120B, 120C, 120D. As is shown in FIGS. 1A and 1B, a location of the imaging device 120A is indicated by coordinates $x_A$, $y_A$, $z_A$, and a field of view of the imaging device 120A is shown by an angle $\gamma_A$. The imaging device 120A is shown as having an axis of orientation $AXIS_A$. Similarly, locations of the imaging devices 120B, 120C, 120D are indicated by coordinates $x_B$, $y_B$, $z_B$; $x_C$, $y_C$, $z_C$; and $x_D$, $y_D$, $z_D$, and fields of view of the imaging device 120B, 120C, 120D are shown by angles $\gamma_B$, $\gamma_C$ and $\gamma_D$, and the axes of orientation $AXIS_B$, $AXIS_C$, $AXIS_D$ of the imaging devices 120B, 120C, 120D are also shown. As is also shown in FIGS. 1A and 1B, a location of the object 102 is indicated by coordinates $x_1$, $y_1$, $z_1$. Therefore, according to some embodiments, the systems and methods disclosed herein are directed to identifying not only one or more of a plurality of imaging devices which may have a view of an object or area of interest, i.e., which of the imaging devices 120A, 120B, 120C, 120D of FIGS. 1A and 1B may have the object 102 in their respective fields of view along their respective axes of orientation, but also which pixels of which imaging devices may have the object in their fields of view, and establishing one or more thresholds or conditions for generating and issuing one or more alarm or alert signals or messages.

Figure 1D:
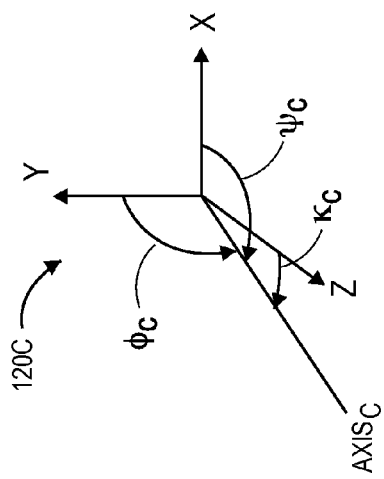
Figure 1E:
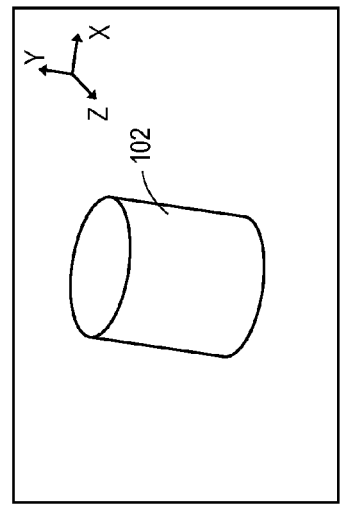
Figure 1C:
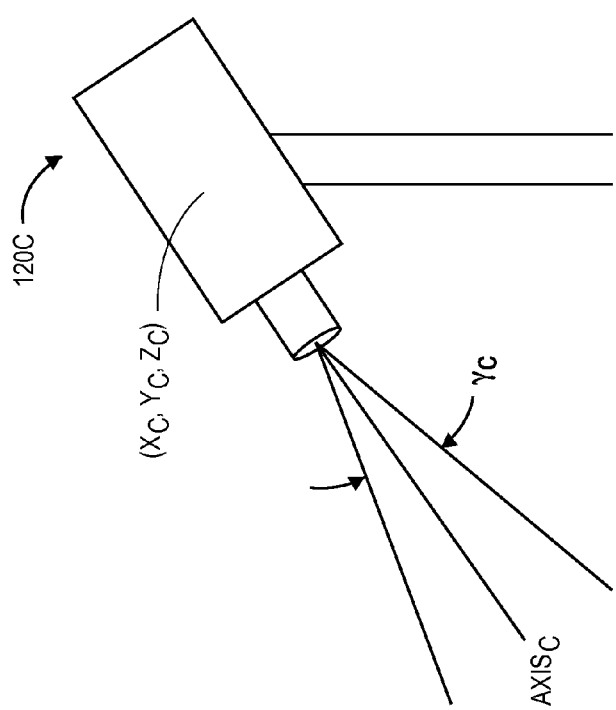

Referring to FIGS. 1C and 1D, an orientation of the imaging device 120C of FIGS. 1A and 1B about an axis $AXIS_C$ is shown. The axis of orientation $AXIS_C$ is expressed as having a roll angle of rotation $\omega_C$ of the axis of orientation with respect to the x-axis, a pitch angle of rotation $\phi_C$ of the axis of orientation with respect to the y-axis and a yaw angle of rotation $\kappa_C$ of the axis of orientation with respect to the z-axis.

The scope and extent of the information that may be captured by the imaging devices 120A, 120B, 120C, 120D of FIGS. 1A and 1B is a function of not only the respective locations of the imaging devices but also their respective orientations and configurations. Referring to FIG. 1E, a view of the object 102 captured by the imaging device 120C of FIGS. 1A, 1B and 1C is shown. The view of the object 102 shown in FIG. 1E is expressed in a back plane having dimensions defined by the position of the imaging device 120C, as indicated by the coordinates $x_C$, $y_C$, $z_C$ shown in FIGS. 1A, 1B and 1C, as well as the axis of orientation $AXIS_C$ of the imaging device 120C, as indicated by the roll angle $\omega_C$, the pitch angle $\phi_C$ and the yaw angle $\kappa_C$, as shown in FIG. 1D, and the field of view of the imaging device 120C, as indicated by the angle $\gamma_C$, as shown in FIGS. 1A, 1B and 1C. Based on the position, the axis of orientation and the field of view of the imaging device 120C, one or more still or moving images of the object 102 may be formed, such as is shown in FIG. 1E. Furthermore, the specific location of the object 102 within the field of view (i.e., the pixels of the field of view in which the object 102 appears) of the imaging device 120C may be identified according to an optical transfer function of the imaging device (or a transfer function of a lens of the imaging device).

Some imaging devices, such as a digital camera, operates by capturing light that is reflected from objects, by calculating or assigning one or more quantitative values to aspects of the reflected light, e.g., pixels, and by generating an output based on such values, or by storing such values in one or more data stores. Digital cameras may include one or more sensors having one or more filters associated therewith, and such sensors may detect information regarding aspects of any number of pixels of the reflected light corresponding to one or more base colors (e.g., red, green or blue) of the reflected light. Such sensors may generate data files including such information, and store such data files in one or more onboard or accessible data stores (e.g., a digital video recorder, or "DVR"), as well as one or more removable data stores (e.g., flash memory devices), or displayed on one or more broadcast or closed-circuit television networks, or over a computer network as the Internet. Data files that are stored in one or more data stores may be printed onto paper, presented on one or more computer displays, or subjected to one or more analyses, such as to identify items expressed therein.

Reflected light may be captured or detected by a digital camera if the reflected light is within the camera's field of view. As is discussed above, a field of view of a camera is defined as a function of a distance between a sensor and a lens, viz., a focal length, within the camera, as well as a location of the camera and an angular orientation of the camera's lens. Where an object appears within a depth of field, or a distance within the field of view where the clarity and focus is sufficiently sharp, a digital camera may capture light that is reflected off objects of any kind to a sufficiently high degree of resolution using one or more sensors thereof, and store information regarding the reflected light in one or more data files.

Many imaging devices also include manual or automatic features for modifying their respective fields of view or orientations. For example, a digital camera may be configured in a fixed position, or with a fixed focal length (e.g., fixed-focus lenses) or angular orientation. Alternatively, an imaging device may include one or more motorized features for adjusting a position of the imaging device, or for adjusting either the focal length (e.g., zooming the imaging device) or the angular orientation (e.g., the roll angle, the pitch angle or the yaw angle), by causing a change in the distance between the sensor and the lens (e.g., optical zoom lenses or digital zoom lenses), a change in the location of the imaging device, or a change in one or more of the angles defining the angular orientation.

For example, a digital camera may be hard-mounted to a support or mounting that maintains the cameras in a fixed configuration or angle with respect to one, two or three axes. Alternatively, however, a digital camera may be provided with one or more motors and/or controllers for manually or automatically operating one or more of the components, or for reorienting the axis or direction of the cameras, i.e., by panning or tilting such cameras. Panning a camera may cause a rotation within a horizontal axis or about a vertical axis (e.g., a yaw), while tilting a camera may cause a rotation within a vertical plane or about a horizontal axis (e.g., a pitch). Additionally, a camera may be rolled, or rotated about its axis of rotation, and within a plane that is perpendicular to the axis of rotation and substantially parallel to a field of view of the camera.

Furthermore, some modern imaging devices may digitally or electronically adjust an image identified in a field of view of an imaging device, subject to the physical and operational constraints of the imaging devices. For example, a digital camera may virtually stretch or condense the pixels of an image in order to focus or broaden the field of view of the digital camera, and also translate one or more portions of images within the field of view. Imaging devices having optically adjustable focal lengths or axes of orientation are commonly referred to as pan-tilt-zoom (or "PTZ") imaging devices, while imaging devices having digitally or electronically adjustable zooming or translating features are commonly referred to as electronic PTZ (or "ePTZ") imaging devices.

Information and/or data regarding features or objects expressed in a digital photograph, including colors, textures or outlines of the objects, may be extracted from the photograph in any number of ways. For example, colors of pixels, or of groups of pixels, in a digital photograph may be determined and quantified according to one or more standards, e.g., the RGB ("red-green-blue") color model, in which the portions of red, green or blue in a pixel are expressed in three corresponding numbers ranging from 0 to 255 in value, or a hexadecimal model, in which a color of a pixel is expressed in a six-character code, wherein each of the characters may have a range of sixteen. Moreover, textures or features of objects expressed in a digital photograph may be identified using one or more computer-based methods, such as by identifying changes in intensities within regions or sectors of the photograph, or by defining areas of a photograph corresponding to specific surfaces. Furthermore, outlines of objects expressed in a digital photograph may be identified using one or more algorithms or machine-learning tools. Some such algorithms or tools may recognize edges, contours or outlines of objects in a digital photograph, or of portions of objects in the digital photograph, and may match the edges, contours or outlines of the objects against information regarding edges, contours or outlines of known objects, which may be stored in one or more data stores.

When imaging devices are utilized in applications such as security monitoring or surveillance, a single imaging device may be provided, or one or more imaging devices may be provided in a matrix, array or other strategic configuration. For example, where the video monitoring of an object or area of interest is desired, a single imaging device may be placed in a location and an orientation in which the object or area of interest remains in the imaging device's field of view, or may be reasonably accessed by the imaging device and placed within the imaging device's field of view. Alternatively, a plurality of imaging devices may be placed in locations and orientations in which various aspects of the object or the area of interest may be captured. Such imaging devices may be functionally identical, or may include one or more different unique sets of attributes or operational capacities.

The systems and methods of the present disclosure are directed to automatically selecting one or more of a plurality of imaging devices, such as imaging devices, for a content-based analysis of an object or an area of interest. The imaging devices may be selected by identifying the locations of the imaging devices, and of the object or the area of interest, and determining, based on the operational properties (e.g., orientations, attributes or capacities) of the imaging devices, the fields of view or coverage zones associated with each of the imaging devices. According to some embodiments of the present disclosure, the fields of view or coverage zones for each of the imaging devices may be determined by generating one or more geometric or mathematical models of the fields of view or coverage zones, such as by defining a geometric section in free space in the form of one or more virtual conical or frustoconical sections, or pyramidal or frustopyramidal sections, according to a coordinate system.

A field of view of an imaging device may thus be defined by a position of the imaging device, a dimension of an image sensor and a focal length between a lens and an image sensor of the imaging device, as well as a roll angle, a pitch angle and a yaw angle of the imaging device. For example, one conical or pyramidal section corresponding to a field of view of an imaging device may be centered about an axis of orientation of the imaging device and may have an origin located at a lens of the imaging device. The position and orientation of the imaging devices, and the positions of the objects or areas of interest, may be expressed according to any coordinate system, and may be defined with regard to a single coordinate point, or with regard to coordinates of one or more two-dimensional line segments or geometric sections, or three-dimensional volumes defined by such segments or sections.

In this regard, the systems and methods of the present disclosure may determine not only whether one of a plurality of imaging devices includes the object or the area of interest within a field of view, but also which of the imaging devices, or which of the pixels within such imaging devices, provides the best or most advantageous image of the object or area of interest, i.e., the image of the object that has a sufficiently large size or level of clarity or resolution. Moreover, the systems and methods of the present disclosure may be used not only with imaging devices or other imaging devices but also in association with any form of sensor.

Once an imaging device including an object or area of interest within a field of view and in an appropriate size, or level of clarity or resolution has been selected, still or moving images and other content captured from the selected imaging device may be subjected to one or more analyses. Some such analyses may extract one or more features or attributes from the content, parse or otherwise arrange the features into a defined structure and identify a subset of the defined structure that refers to the extracted features as functions of time or space. Once the defined structure has been established using audio and/or video content captured from one or more imaging devices, the extracted features may be analyzed to determine whether such features correspond with one or more items, conditions, statuses or events.

According to one such embodiment, a selected imaging device may be preprogrammed to recognize an item, a condition, a status or an event, according to any given triggering events or metrics, or other relevant thresholds associated with the images, which may be of any relevant compression or scalable quality, or other content that may be captured by the selected device. When a selected device recognizes one or more predefined items, conditions, statuses or events, an indicator such as an electronic signal or an alarm may be provided to a monitoring entity or individual, i.e., on a computer display, or by any other computer output device such as a speaker or printer, or in another format, such as a text message or electronic mail message, and any action may be taken in response to the signal or alarm.

Using the locations, the orientations and the operational capacities of the imaging devices, one or more models of a field of view or a coverage zone for each of the imaging devices may be generated, and the object or area of interest may be back-projected into one or more of such fields of view or zones according to an optical transfer function of the imaging device. The optical transfer function may provide for a mathematical transformation that converts the coordinates associated with objects in free space to coordinates associated with the objects in an image captured by the imaging device based on factors such as the position of the imaging device (e.g., the x-, y- and z-coordinates of the imaging device), the angles (e.g., the roll, pitch and yaw angles) of the axis of orientation of the imaging device, and the coordinates of the objects (e.g., the x-, y- and z-coordinates of the imaging device). The optical transfer function may thus take the form of a two-dimensional array representative of pixel intensity and pixel positions that translates real data to image data, or vice versa.

For example, a imaging device transformation or projection transformation may determine relations between the real-world locations and/or orientations of objects or areas of interest (i.e., in three dimensions) to the modeled fields of view, in order to determine which of the imaging devices may cover the object or the area of interest, and which of the pixels within images captured by such imaging devices include the object or the area of interest, e.g., by determining a distance of the object or the area of interest to an origin defined by the imaging device, and dimensions above, below and around the object within the field of view of the imaging devices at the distance from the origin. The information or variables associated with the imaging device transformation or projection transformation may be provided in one or more matrices, which may be scaled proportionally as required in order to determine the extent to which the object appears within the field of view of each imaging device.

Such a back-projection may occur in response to a change in state or motion of the imaging devices, or of the object or the area of interest, and may be used to identify imaging devices, and pixels of images captured by such imaging devices, in which the object or area of interest may be found, as well as to determine the quality or resolution of the images that may be captured using each imaging device. Additionally, the imaging devices or pixels to be evaluated may be selected in real time or in near-real time with respect to imaging devices that are operating, or forensically with respect to imaging devices that were operating at a prior time.

The systems and methods disclosed herein may provide a number of advantages over systems and methods of the prior art. For example, such systems and methods may result in savings of cost and labor in determining which of a plurality of imaging devices may be selected and/or operated in order to evaluate an object or area of interest at a given location. Additionally, such systems and methods may further enable greater efficiency in scheduling or prioritizing the operation of one or more specific imaging devices, by permitting users to selectively operate imaging devices that may access or capture information regarding the object or area of interest. Furthermore, the systems and methods disclosed herein enable the forensic analysis of images obtained using a plurality of imaging devices by automatically identifying which of the imaging devices may have captured images of an object or area of interest, and which could not have captured any such images.

Accordingly, the systems and methods disclosed herein may be utilized in nearly any application in which multiple imaging devices may be provided. Such applications may include the monitoring of traffic flow, the protection of one or more secure facilities, e.g., a fulfillment center, or any other like operations.

Figure 2:
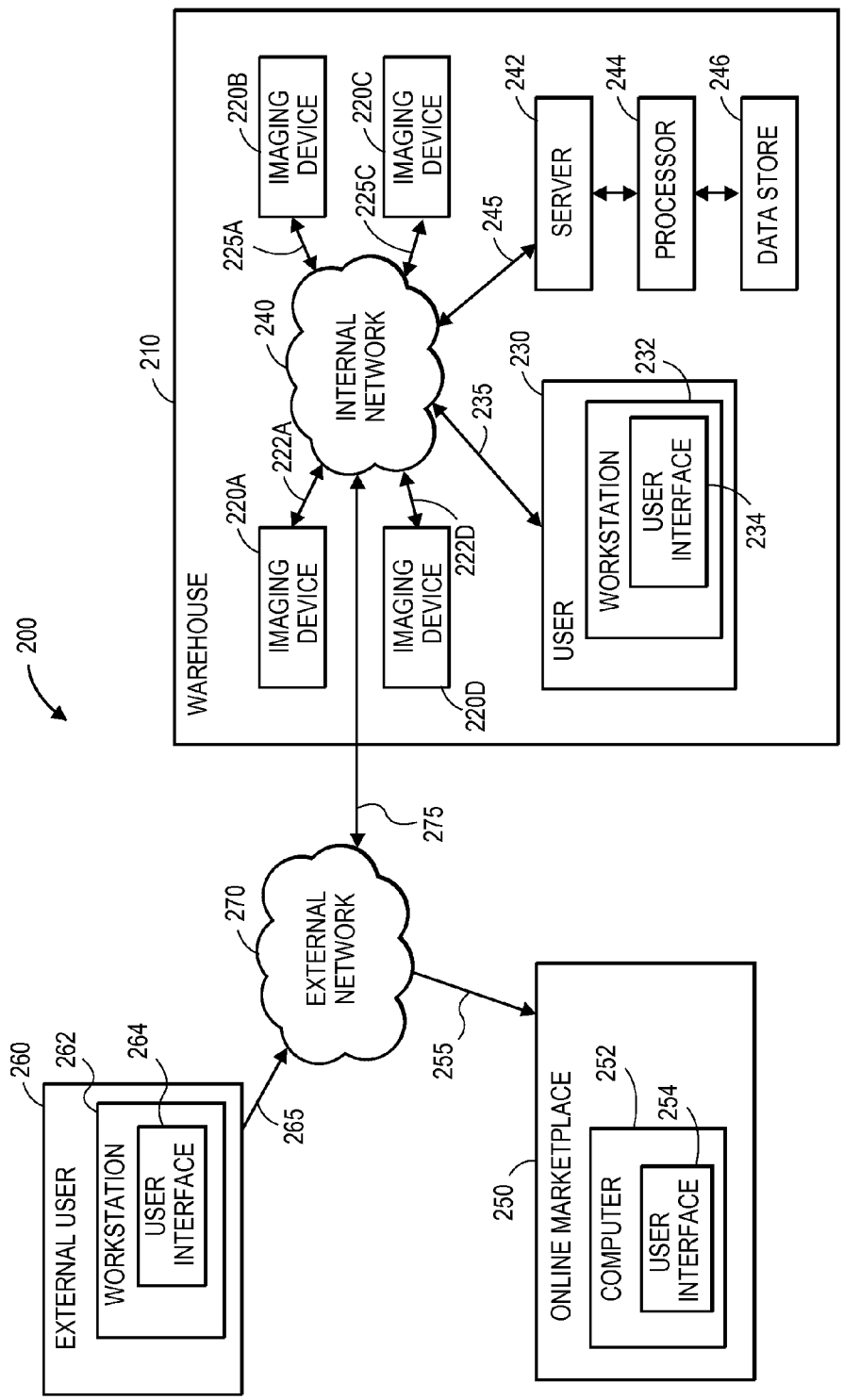
FIG. 2 is a block diagram of components of one system for automatically selecting imaging devices for video analytics, in accordance with embodiments of the present disclosure.

Referring to FIG. 2, a block diagram of one system 200 for automatically selecting imaging devices for video analytics is shown. The system 200 includes a warehouse 210, an online marketplace 250 and an external user 260 that are connected to one another across an external network 270, such as the Internet.

The warehouse 210 may be any facility that is adapted to receive, store, process and/or distribute items, such as a fulfillment center, and may include any apparatuses that may be required in order to receive shipments of items from one or more sources and/or through one or more channels, including but not limited to docks, lifts, cranes, jacks, belts or other conveying apparatuses for obtaining items and/or shipments of items from carriers such as cars, trucks, trailers, freight cars, container ships or cargo aircraft (e.g., manned aircraft or unmanned aircraft, such as drones), and preparing such items for storage or distribution to customers. The warehouse 210 may also include one or more storage areas having predefined two-dimensional or three-dimensional spaces for accommodating items and/or containers of such items, such as aisles, rows, bays, shelves, slots, bins, racks, tiers, bars, hooks, cubbies or other like storage means, or any other appropriate regions or stations. The warehouse 210 may further include one or more regions or stations where items that have been retrieved from a designated storage area may be evaluated, prepared and packed for delivery to addresses, locations or destinations specified by customers, also by way of carriers such as cars, trucks, trailers, freight cars, container ships or cargo aircraft (e.g., manned aircraft or unmanned aircraft, such as drones).

As is shown in FIG. 2, the warehouse 210 includes a plurality of imaging devices 220A, 220B, 220C, 220D and a user 230 that are connected to one another across an internal network 240, along with a plurality of computer-related components, including a server 242, a processor 244 and a data store 246. The imaging devices 220A, 220B, 220C, 220D may comprise any form of optical recording device that may be used to photograph or otherwise record images of structures, facilities or other elements within the warehouse 210, as well as the items within the warehouse 210, or for any other purpose. Such imaging devices 220A, 220B, 220C, 220D may capture one or more still or moving images, as well as any relevant audio signals or other information, within one or more designated locations within the warehouse 210, and may be connected to one another by way of the internal network 240, as indicated by lines 225A, 225B, 225C, 225D, by the transmission and receipt of digital data. Additionally, the imaging devices 220A, 220B, 220C, 220D may be adapted or otherwise configured to communicate with one another, or with the user 230, the server 242, the processor 244 or the data store 246, or to access one or more other computer devices by way of the external network 270, over the internal network 240. Although the warehouse 210 of FIG. 2 includes four imaging devices 220A, 220B, 220C, 220D, any number or type of imaging devices may be provided in accordance with the present disclosure, including but not limited to imaging devices or other optical sensors.

The user 230 may be an entity or individual that utilizes one or more order processing and/or communication systems using a computing device such as the workstation 232 or any other like machine that may operate or access one or more software applications including one or more user interfaces 234 (e.g., a browser), or through one or more other computing machines that may be connected to the internal network 240 or the external network 270, as is indicated by line 235, in order to transmit or receive information in the form of digital or analog data, or for any other purpose. The workstation 232 may also operate or provide access to one or more reporting systems for receiving or displaying information or data regarding workflow operations, and may provide one or more interfaces, such as the user interface 234, for receiving interactions (e.g., text, numeric entries or selections) from one or more operators, users or workers in response to such information or data. The workstation 232 may further operate or provide access to one or more engines for analyzing the information or data regarding the workflow operations, or the interactions received from the one or more operators, users or workers.

For example, the user 230 may review information identified by the imaging devices 220A, 220B, 220C, 220D on the user interface 234, access any information or execute any commands using the server 242, the processor 244 or the data store 246, or perform any other functions, using the workstation 232, which may be a general purpose device such a personal digital assistant, a digital media player, a smartphone, a tablet computer, a desktop computer or a laptop computer, and may include any form of input and/or output peripherals such as scanners, readers, keyboards, keypads, touchscreens or like devices. The workstation 232 may be connected to or otherwise communicate with the imaging devices 220A, 220B, 220C, 220D, the server 242, the processor 244 and/or the data store 246, through the internal network 240, as indicated by line 235, by the transmission and receipt of digital data. Additionally, the workstation 232 may be connected to or otherwise communicate with the online marketplace 250 or the external user 260 through the external network 270, by way of a connection 275 between the internal network 240 and the external network 270.

The warehouse 210 may also maintain one or more control systems for conducting operations at one or more receiving stations, storage areas or distribution stations. Such control systems may be associated with the workstation 232 or one or more other computing machines, and may include one or more physical computer devices or servers 242, processors 244 or data stores 246, which may be configured to transmit, process or store any type of information, including but not limited to information regarding locations and/or orientations of imaging devices, or locations of objects or areas of interest.

Additionally, such control systems may communicate with the online marketplace 250 or the external user 260, as well as one or more workers or staff members, including but not limited to the user 230, who may handle or transport items within the warehouse 210. Such workers may operate one or more computing devices for registering the receipt, retrieval, transportation or storage of items within the fulfillment center, such as the workstation 232, or a general purpose device such a personal digital assistant, a digital media player, a smartphone, a tablet computer, a desktop computer or a laptop computer, and may include any form of input and/or output peripherals such as scanners, readers, keyboards, keypads, touchscreens or like devices.

The internal network 240 may be any wired network, wireless network, or combination thereof, such as a personal area network, local area network, wide area network, cable network, satellite network, cellular telephone network, or combination thereof that may be associated with computer-based operations within the warehouse 210. For example, the internal network 240 may be a publicly accessible network of linked networks, possibly operated by various distinct parties, such as the Internet. In some embodiments, the internal network 240 may be a private or semi-private network, such as a corporate or university intranet. The internal network 240 may include one or more wireless networks, such as a Global System for Mobile Communications (GSM) network, a Code Division Multiple Access (CDMA) network, a Long Term Evolution (LTE) network, or some other type of wireless network. Protocols and components for communicating via the Internet or any of the other aforementioned types of communication networks are well known to those skilled in the art of computer communications and thus, need not be described in more detail herein.

The marketplace 250 may be owned or operated any entity or individual that sells or otherwise makes items available from one or more sources (e.g., merchants, vendors, sellers, distributors or manufacturers of such items), for download, purchase, rent, lease or borrowing by customers. Additionally, the marketplace 250 itself may also be a vendor, a seller, a distributor or a manufacturer of the items that are to be made available there.

The marketplace 250 may include or operate one or more physical computer devices, such as a computer 252 or any other like machine that may operate or access one or more software applications including one or more user interfaces 254. The computer 252 may be connected to or otherwise communicate with the warehouse 210 or the external user 260 through the network 270, as indicated by line 255, by the transmission and receipt of digital data. Additionally, the marketplace 250 may maintain a marketplace network site that may be implemented using one or more servers or data stores (not shown). The network site may be maintained in the form of programmed code, which may be generated manually or automatically, and in accordance with any schedule, such as in real time or in near-real time, or in one or more batch processes. Additionally, the marketplace 250 may feature software applications and/or hardware components for analyzing data received from merchants, or from customers, including data regarding merchants' product offerings, prices and any relevant accounting information, as well as data regarding customers' movements, actions, preferences, purchasing histories or personal information. The marketplace 250 and the computer 252, as well as any associated servers, data stores or network sites, may be connected to or otherwise communicate with customers by sending and receiving digital data over the external network 270, as indicated by lines 255.

In some embodiments, the marketplace 250 may correspond to a logical association of one or more computing devices, such as an application server for generating recommendations and determining consumption classes for users and content as described in greater detail below; a network server for creating and transmitting user interfaces; or a database server for storing data regarding users, items, etc. In some embodiments, the features and services provided by the marketplace 250 may be implemented as network services or web services consumable via the external network 270. In further embodiments, the marketplace 250 is provided by one more virtual machines implemented in a hosted computing environment. The hosted computing environment may include one or more rapidly provisioned and released computing resources, which computing resources may include computing, networking and/or storage devices. A hosted computing environment may also be referred to as a cloud-computing environment.

The external user 260 may be any entity or individual, other than the user 230, that utilizes one or more computing devices, such as the workstation 262 or any other like machine that may operate or access one or more software applications including one or more user interfaces 264. The workstation 262 may be connected to or otherwise communicate with the warehouse 210 or the online marketplace 250 through the network 270, as indicated by line 265, by the transmission and receipt of digital data. For example, the external user 260 may review information identified by any of the imaging devices 220A, 220B, 220C, 220D on the user interface 264, or perform any other functions using the workstation 262, which, like the computer 232, may be a general purpose device such a personal digital assistant, a digital media player, a smartphone, a tablet computer, a desktop computer or a laptop computer, and may include any form of input and/or output peripherals such as scanners, readers, keyboards, keypads, touchscreens or like devices.

The external network 270 may be any wired network, wireless network, or combination thereof. In addition, the external network 270 may be a personal area network, local area network, wide area network, cable network, satellite network, cellular telephone network, or combination thereof. Like the internal network 240, the external network 270 may be a publicly accessible network of linked networks, possibly operated by various distinct parties, such as the Internet. In some embodiments, the external network 270 may be a private or semi-private network, such as a corporate or university intranet. The external network 270 may include one or more wireless networks, such as a Global System for Mobile Communications (GSM) network, a Code Division Multiple Access (CDMA) network, a Long Term Evolution (LTE) network, or some other type of wireless network. Protocols and components for communicating via the Internet or any of the other aforementioned types of communication networks are well known to those skilled in the art of computer communications and thus, need not be described in more detail herein.

The computers, servers, devices and the like described herein have the necessary electronics, software, memory, storage, databases, firmware, logic/state machines, microprocessors, communication links, displays or other visual or audio user interfaces, printing devices, and any other input/output interfaces to provide any of the functions or services described herein and/or achieve the results described herein. Also, those of ordinary skill in the pertinent art will recognize that users of such computers, servers, devices and the like may operate a keyboard, keypad, mouse, stylus, touch screen, or other device (not shown) or method to interact with the computers, servers, devices and the like, or to "select" an item, link, node, hub or any other aspect of the present disclosure.

Those of ordinary skill in the pertinent arts will understand that process steps described herein as being performed by a "user" or by a "warehouse" may be automated steps performed by their respective computer systems, or implemented within software modules (or computer programs) executed by one or more general purpose computers. Moreover, process steps described as being performed by a "user" or by a "warehouse" may be typically performed by a human operator, but could, alternatively, be performed by an automated agent. Moreover, those of ordinary skill in the pertinent arts will further understand that process steps described herein as being performed using a "camera" may be performed using any form of imaging device, or any type of sensor.

The warehouse 210, the imaging devices 220A, 220B, 220C, 220D, the workstation 232, the marketplace 250, the computer 252 and/or the external user 260 or workstation 262 may use any web-enabled or Internet applications or features, or any other client-server applications or features including electronic mail (or E-mail), or other messaging techniques, to connect to the external network 270 or to communicate with one another, such as through short or multimedia messaging service (SMS or MMS) text messages. For example, the imaging devices 220A, 220B, 220C, 220D may be adapted to transmit information or data in the form of synchronous or asynchronous messages to the workstation 232, the computer 252 or the workstation 262 or another computer device in real time or in near-real time, or in one or more offline processes, via the internal network 240 and/or the external network 270. Those of ordinary skill in the pertinent art would recognize that the user 230, the marketplace 250 and/or the external user 260 may operate any of a number of computing devices that are capable of communicating over the network, including but not limited to set-top boxes, personal digital assistants, digital media players, web pads, laptop computers, desktop computers, electronic book readers, and the like. The protocols and components for providing communication between such devices are well known to those skilled in the art of computer communications and need not be described in more detail herein.

The data and/or computer executable instructions, programs, firmware, software and the like (also referred to herein as "computer executable" components) described herein may be stored on a computer-readable medium that is within or accessible by computers, such as the workstation 232, the computer 252 or the workstation 262, or any computers or control systems utilized by the user 202, the marketplace 250 and/or the external user 260 and having sequences of instructions which, when executed by a processor (e.g., a central processing unit, or "CPU"), cause the processor to perform all or a portion of the functions, services and/or methods described herein. Such computer executable instructions, programs, software and the like may be loaded into the memory of one or more computers using a drive mechanism associated with the computer readable medium, such as a floppy drive, CD-ROM drive, DVD-ROM drive, network interface, or the like, or via external connections.

Some embodiments of the systems and methods of the present disclosure may also be provided as a computer executable program product including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, ROMs, RAMs, erasable programmable ROMs ("EPROM"), electrically erasable programmable ROMs ("EEPROM"), flash memory, magnetic or optical cards, solid-state memory devices, or other types of media/machine-readable medium that may be suitable for storing electronic instructions. Further, embodiments may also be provided as a computer executable program product that includes a transitory machine-readable signal (in compressed or uncompressed form). Examples of machine-readable signals, whether modulated using a carrier or not, may include, but are not limited to, signals that a computer system or machine hosting or running a computer program can be configured to access, or including signals that may be downloaded through the Internet or other networks.

Figure 3:
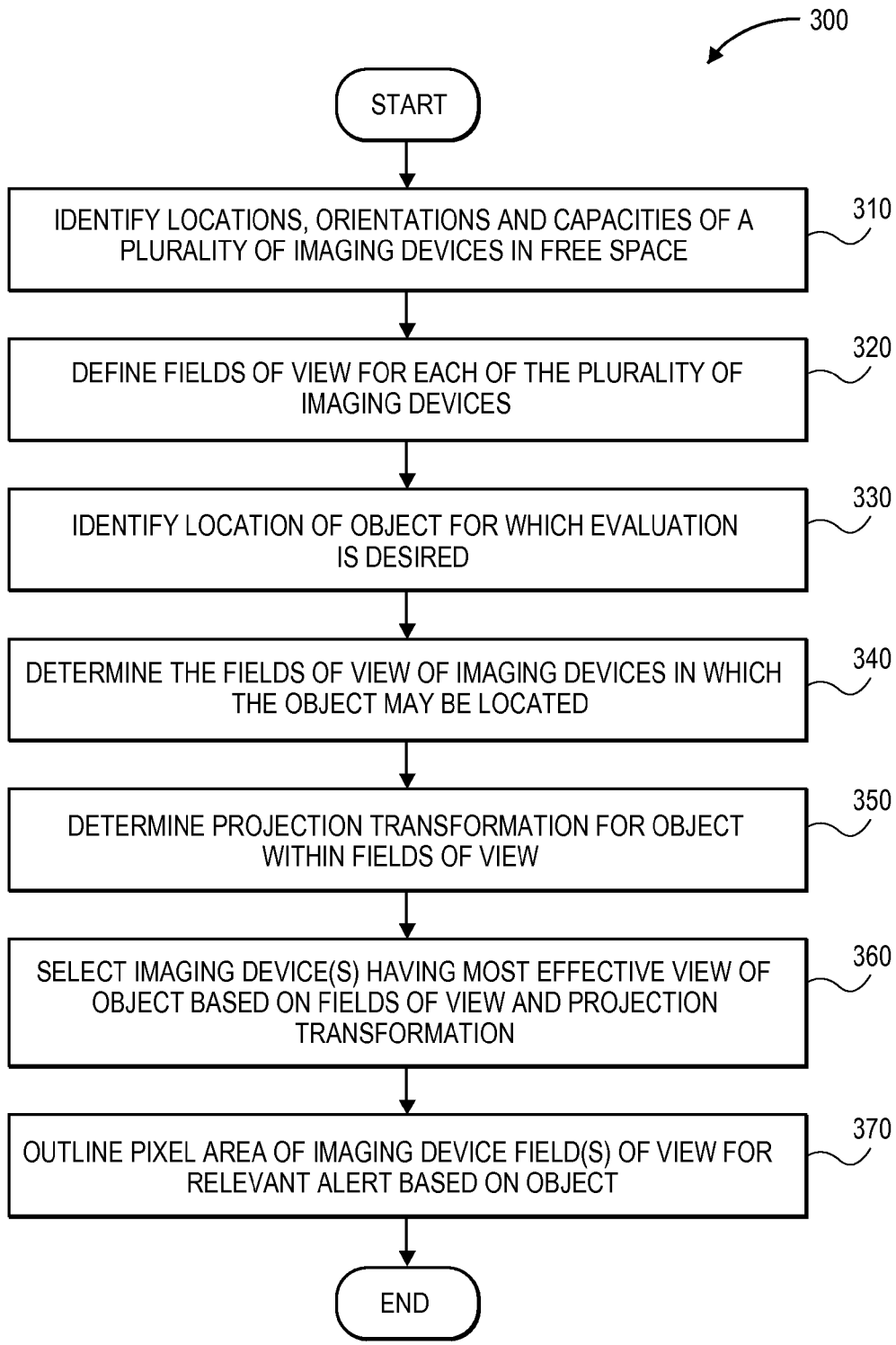
FIG. 3 is a flow chart of one process for automatically selecting imaging devices for video analytics, in accordance with embodiments of the present disclosure.

As is discussed above, one or more imaging devices, or areas of pixels within fields of view of the imaging devices, may be identified as including an object or area of interest within a coverage zone thereof based on information regarding locations of the imaging devices and the object or area of interest, as well as information that may be known regarding the operational properties (e.g., orientations, attributes or capacities) of the imaging devices. Once a imaging device, or an area of pixels within a field of view of the imaging device, has been identified as including the object or area of interest therein, one or more alert or alarm conditions may be established for the imaging device or the area of pixels, such that any change, motion or other predetermined action occurring within the field of view of the imaging device or the area of pixels results in an alert or an alarm. Referring to FIG. 3, a flow chart 300 representing one embodiment of a process for automatically selecting imaging devices for video analytics in accordance with embodiments of the present disclosure is shown. At box 310, locations, orientations and capacities of a plurality of imaging devices in a three-dimensional free space are identified. Such imaging devices may be installed or otherwise provided in an array or other defined layout, e.g., in designated locations within a warehouse, a fulfillment center or other like facility.

At box 320, the fields of view for each of the plurality of imaging devices are defined. For example, based on information regarding the locations, orientations and capacities of the plurality of imaging devices identified at box 310, such as the coordinates $x_C$, $y_C$, $z_C$, the angle of view $\gamma_C$ and the axis of orientation $AXIS_C$ defined by the roll angle $\omega_C$, the pitch angle $\phi_C$ or the yaw angle $\kappa_C$ for the imaging device 120C of FIG. 1C, as well as the corresponding coordinates and angles for the imaging devices 120A, 120B, 120D of FIGS. 1A and 1B, one or more geometric or mathematical models (e.g., virtual conical or pyramidal sections) of the fields of view of the plurality of imaging devices may be determined with respect to the free space. One model of a field of view of a imaging device may include a virtual conical or pyramidal section having an origin at a lens of the imaging device and an angle defined by a dimension of an image sensor and a focal length between the lens and the image sensor, as well as an axis of orientation defined by a roll angle, a pitch angle and a yaw angle of the lens. Such fields of view may also be determined as functions of the respective positions, focal lengths or angles of the imaging devices, and may be fixed or variable depending on the capacities of the imaging devices. For example, where an imaging device includes an optical zoom or digital zoom function and a mounting that may be panned or tilted, the field of view may be expressed in one or more variables or functions of time.

At box 330, a location of the object for which evaluation is desired may be determined. For example, referring again to FIGS. 1A and 1B, the coordinates $x_1$, $y_1$, $z_1$ or other information associated with the location of the object 102 may be identified. At box 340, the fields of view of the imaging devices in which the object may be located are identified. For example, using one or more models that may be generated based on the locations, orientations and capacities of the imaging devices identified at box 310, the one or more imaging devices that include the object within a field or view, or may be adjusted to include the object within a field of view, may be identified.

At box 350, a projection transformation for the object within the fields of view may be determined, e.g., according to an optical transfer function. For example, the dimensions of the object within each of the fields of view of imaging devices in which the object may be found may be determined using the locations, orientations and capacities of the respective imaging devices identified at box 310, as well as the location of the object identified at box 330, through one or more geometric techniques. As is discussed above, an optical transfer function may mathematically transform the coordinates associated with the object in free space to coordinates associated with the object in an image captured by the imaging device based on factors such as the position of the imaging device, the angles of the axis of orientation of the imaging device, and the coordinates of the objects. At box 360, the imaging devices having the most effective views of the object based on the fields of view and the projection transformation are identified. Such views may be defined by the sizes, clarity or resolution of the images of the object, or according to any desired standard.

At box 370, a pixel area of the fields of view of the imaging devices may be outlined for a relevant alert, and the process ends. The pixel area may encompass all or a portion of the fields of view, and the relevant alert may be defined based on any detection or determination that an item is present, or that a condition, a status or an event has occurred, according to any given triggering events or metrics, or other relevant thresholds. Once the parameters of the relevant alert have been defined with respect to images captured in or by one or more imaging devices or fields of view, the systems and methods disclosed herein may engage in persistent or scheduled monitoring of the object, and the detection or determination of the item, the condition, the status or the event may trigger or otherwise cause any relevant action to occur in response to the detection or determination, such as the sounding of an alarm, the transmission of one or more messages, or any other response.

Figure 4A:
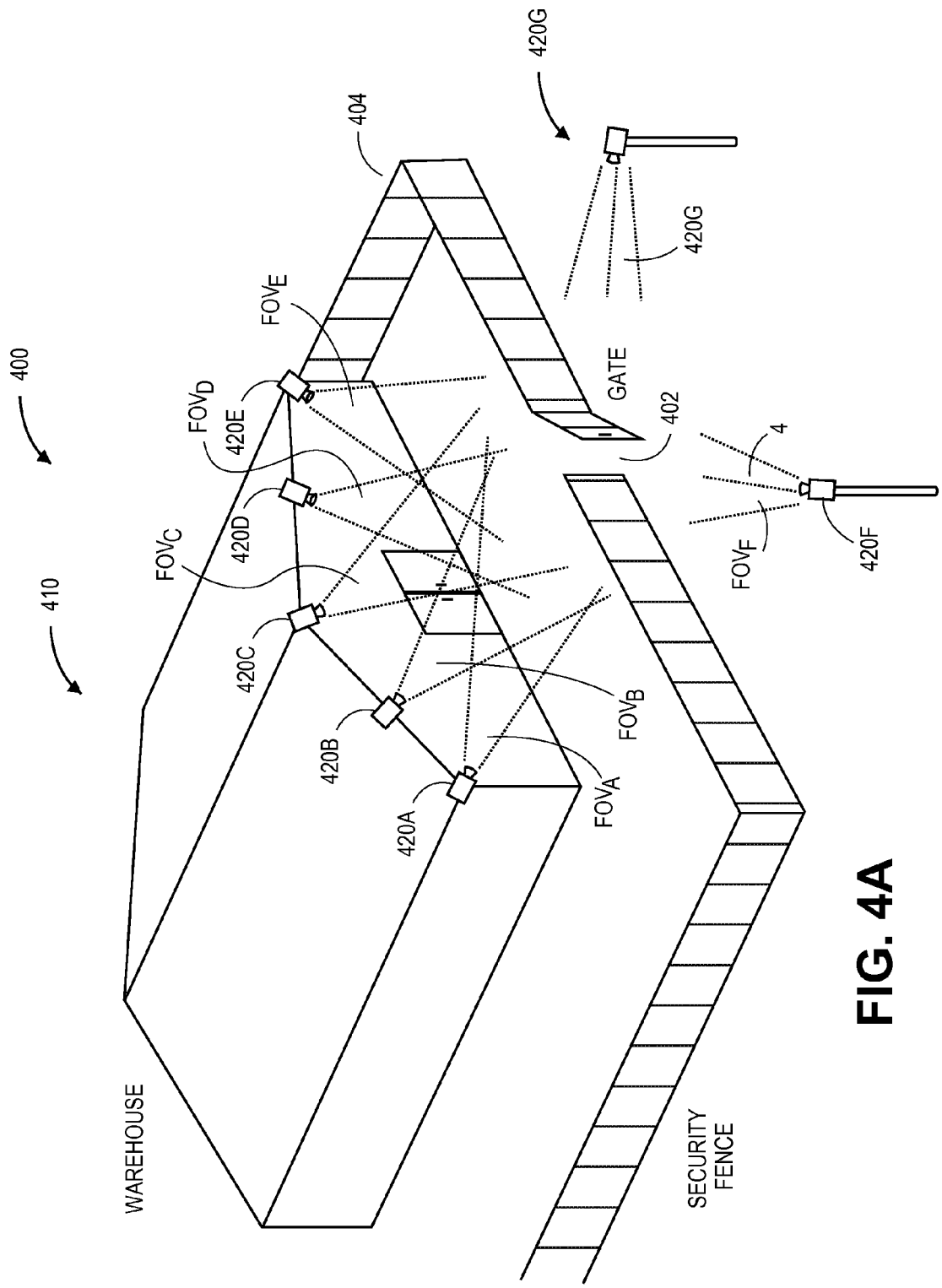
FIGS. 4A and 4B are views of one system for automatically selecting imaging devices for video analytics, in accordance with embodiments of the present disclosure.
Figure 4B:
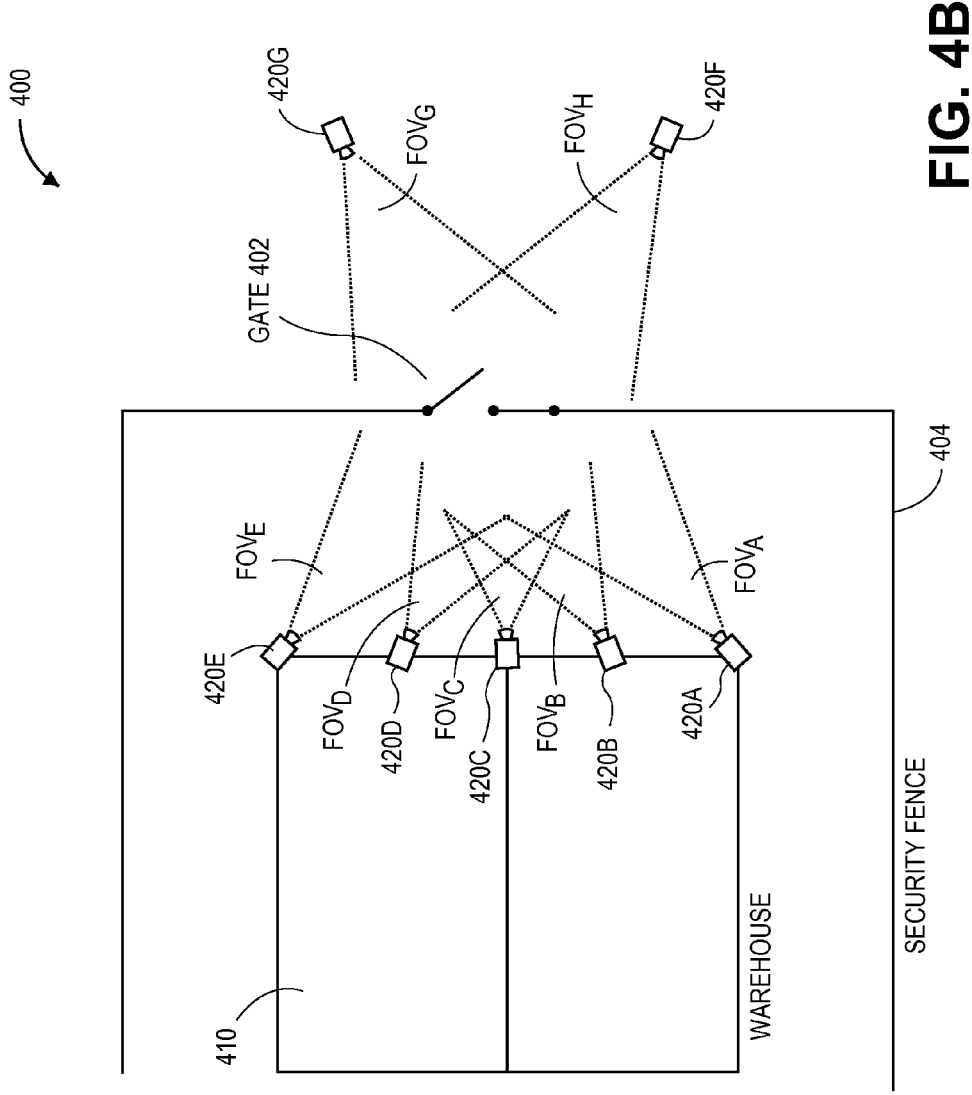

Accordingly, the systems and methods of the present disclosure may enable the selection of one or more appropriate imaging devices for monitoring an object or area of interest, and any relevant information associated with the object or the area of interest may be identified through a content-based analysis of still or moving images captured of the object or the area of interest. Referring to FIGS. 4A and 4B, views of one system 400 for automatically selecting imaging devices for video analytics in accordance with embodiments of the present disclosure are shown. The system 400 includes a warehouse 410 or fulfillment center having a gate 402 and security fence 404.

Additionally, the system 400 further includes a plurality of imaging devices 420A, 420B, 420C, 420D, 420E mounted to the warehouse 410, as well as imaging devices 420F, 420G mounted outside the gate 402 and security fence 404. As is shown in FIGS. 4A and 4B, each of the imaging devices 420A, 420B, 420C, 420D, 420E, 420F, 420G provides a field of view $FOV_A$, $FOV_B$, $FOV_C$, $FOV_D$, $FOV_E$, $FOV_F$, $FOV_G$ oriented toward the gate 402 and/or the security fence 404.

As is discussed above, the systems and methods of the present disclosure are directed to selecting one or more imaging devices, such as one or more of imaging devices 420A, 420B, 420C, 420D, 420E, 420F, 420G of FIGS. 4A and 4B, for the purpose of monitoring an object or area of interest, such as the gate 402 or the security fence 404 of FIGS. 4A and 4B, based on the location of the object or area of interest, and the locations and operational attributes of the imaging devices. One or more geometric or mathematical models of the fields of view provided by the imaging devices (e.g., conical or pyramidal sections representative of such fields of view) may be generated and used to determine whether or which imaging devices may have a view of the object or area of interest. Once such imaging devices may be identified, a set of conditions or thresholds associated with the object or area of interest may be defined, and the systems and methods disclosed herein may be configured to take one or more actions in response to events that satisfy one or more of the conditions, or exceed one or more of the thresholds.

For example, where a selected one of the imaging devices 420A, 420B, 420C, 420D, 420E, 420F, 420G of FIGS. 4A and 4B detects an operation of the gate 402 or any form of breach of the security fence 404 within one or more predefined areas of a field of view, an alert or alarm signal may be generated, and one or more actions may be taken in response to the signal. Additionally, if multiple imaging devices may include the object or area of interest within their respective fields of view, a imaging device having a preferred or superior view of the object or area of interest may be selected, or multiple imaging devices may be used to determine whether one or more of the conditions has been satisfied, or one or more of the thresholds has been exceeded.

Figure 5:
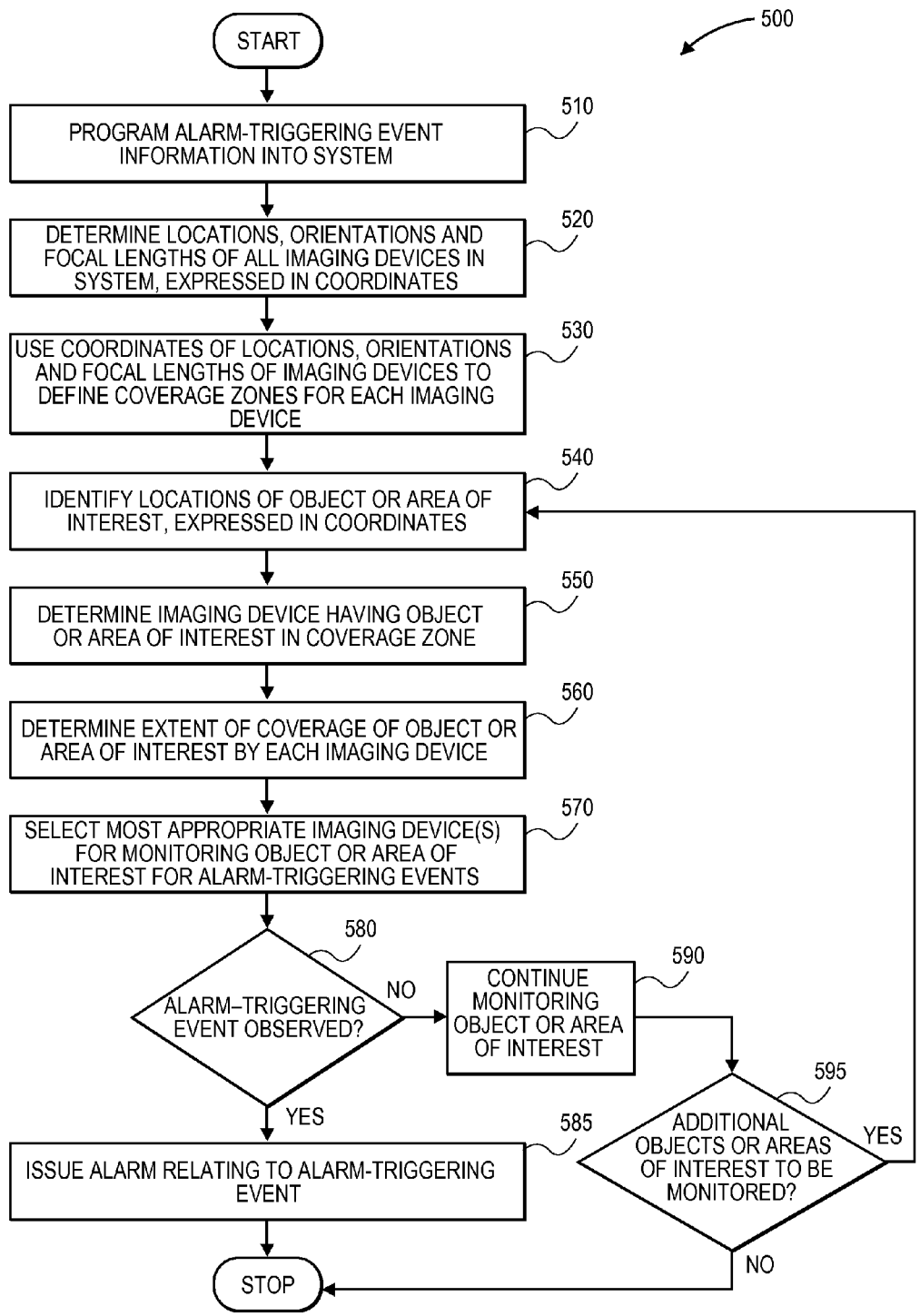
FIG. 5 is a flow chart of one process for automatically selecting imaging devices for video analytics, in accordance with embodiments of the present disclosure.

Referring to FIG. 5, a flow chart 500 representing one embodiment of a process for automatically selecting imaging devices for video analytics in accordance with embodiments of the present disclosure is shown. At box 510, information regarding one or more alarm-triggering events is programmed into a system having a plurality of imaging devices. Such information may relate to an item, a condition, a status or an event, such as an operation of the gate 402 or a breach of the security fence 404 of FIGS. 4A and 4B, a movement of the object 102 of FIGS. 1A and 1B, or any other general or specific occurrence.

At box 520, the locations, orientations and/or focal lengths of all of the imaging devices in the system are determined. Such locations and orientations may be expressed according to any defined coordinate standard, e.g., a Cartesian or polar coordinate system, and the locations, orientations or focal lengths may be fixed or adjustable depending on the corresponding capacities of the respective imaging devices. At box 530, the coordinates of the locations and orientations, and the focal lengths, may be used to define one or more coverage zones for each of the imaging devices. Where the imaging devices are stationary and have fixed orientations and focal lengths, the coverage zones defined according to such locations, orientations or focal lengths are similarly fixed. Where the imaging devices have one or more adjustable features, including structures or mounts which permit the imaging devices to change their locations or orientations, or to adjust their focal lengths, however, such coverage zones may be expressed as functions of space and/or time.

At box 540, the locations of an object or an area of interest may be identified, and expressed in coordinates. Such locations may also be fixed or adjustable, depending on the object or the area of interest, and may be expressed in the same coordinate standard as the locations of the imaging devices that were determined at box 520. At box 550, one or more imaging devices having the object or the area of interest within the coverage zone may be identified, and at box 560, the extent of coverage of the object or the area of interest by each of the imaging devices may be determined. For example, the locations of the objects or areas of interest identified at box 540 may be back-projected through a imaging device transformation according to an optical transfer function, in order to determine which of the imaging devices include the object in a field of view, and which of the pixels of the images captured by such imaging devices include the object. A coverage zone for an imaging device may be defined by a field of view of the imaging device, or a subset of the field of view, which may be further defined by a number or location of pixels within the field of view.

At box 570, one or more appropriate imaging devices for monitoring the object or the area of interest are selected. For example, once the specific locations of the objects or areas of interest within the fields of view are identified, such as with regard to the number or locations of the pixels within the fields of view, the imaging devices having the best or most appropriate views of the object or the area of interest may be chosen for monitoring purposes. At box 580, the system determines whether one or more of the alarm-triggering events are observed. For example, where the system is programmed to recognize an operation of the gate 402 or a breach of the security fence 404 of FIGS. 4A and 4B, or a movement of the object 102 of FIGS. 1A and 1B within fields of view of one or more of the plurality of imaging devices, the system may recognize, through a content-based analysis of the still and/or moving images captured by the selected imaging devices, whether one or more such a breach or movement has occurred.

If an alarm-triggering event defined by the information programmed into the system at box 510 has occurred, then the process advances to box 585, where an alarm relating to the alarm-triggering event is issued. Such an alarm may comprise an electronic signal (e.g., an audio or video signal), a transmission of one or more electronic messages, or any other appropriate action in response to the alarm. In some embodiments, one set of actions in response to the alarm may be to focus or reorient one or more additional imaging devices, such as one or more of the imaging devices 420A, 420B, 420C, 420D, 420E, 420F, 420G of FIG. 4A or 4B, or the imaging devices 120A, 120B, 120C, 120D of FIG. 1A or 1B, to gain additional information regarding the alarm-triggering event or the associated object or area of interest.

If no such alarm-triggering event is observed, then the process advances to box 590, where the system continues to monitor the object or the area of interest identified at box 540, and to box 595, where the system prompts a user for additional objects or areas of interest that are to be monitored. If no additional objects or areas of interest are to be monitored, then the process ends. If any such objects or areas of interest are to be monitored, however, then the process returns to box 540, where the locations of such objects or areas of interest are identified in coordinates, such as the same coordinate standard as the locations of the imaging devices that were determined at box 520, and the process ends.

Accordingly, by selecting an imaging device, or a portion of a field of view of the imaging device, having a view of an object or an area of interest, the systems and methods of the present disclosure may be programmed to recognize an item, a condition, a status or an event, and to generate an alert or alarm, such as an audio or visual alarm, an electronic message or other identifier, in response to the recognition of the item, the condition, the status or the event.

As is also discussed above, the systems and methods of the present disclosure may be configured to identify which of a plurality of imaging devices, or portions of fields of view of such imaging devices, includes an object or an area of interest in hindsight, based on the location of the object or the area of interest, and the locations and operational properties of the imaging devices. In this regard, where an event of interest has occurred in a vicinity of a number of operating imaging devices, the imaging devices which may have captured images of the event of interest may be forensically identified by generating models of the fields of view of each of the imaging devices and comparing such models to the location at which the event of interest occurred.

Figure 6:
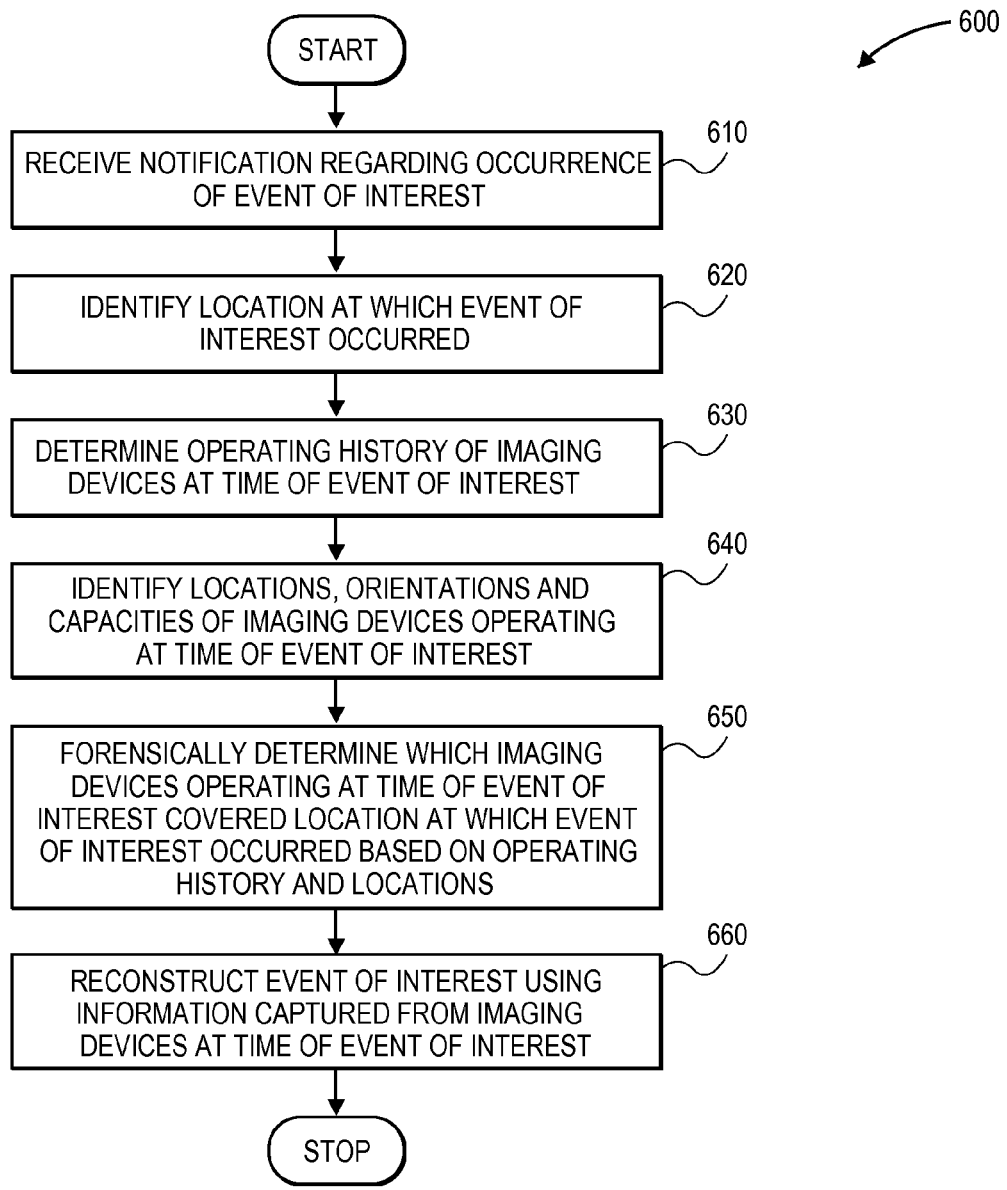
FIG. 6 is a flow chart of one process for automatically selecting imaging devices for video analytics, in accordance with embodiments of the present disclosure.

Referring to FIG. 6, a flow chart 600 representing one embodiment of a process for automatically selecting imaging devices for video analytics in accordance with embodiments of the present disclosure is shown. At box 610, a notification regarding the occurrence of an event of interest is received. The occurrence may be identified manually or automatically, such as in response to a signal generated by a motion sensor, a security alarm, or the like.

At box 620, a location at which the event of interest occurred is identified. The location may be identified by any means or method, and may be referenced in terms of coordinates or other identifying information or data according to any standard. At box 630, the operating histories of a plurality of imaging devices at a time of the event of interest are determined. For example, the number of a plurality of imaging devices in a vicinity of the location of the event of interest, and the times at which each of the plurality of imaging devices was operating, may be identified. At box 640, the locations, orientations and capacities of the imaging devices that were operating at the time of the event of interest are identified. Such locations and orientations may be expressed in terms of coordinates and/or angles or axes of orientation (e.g., x-, y- and z-coordinates of imaging devices, as well as roll, pitch and yaw angles of axes of orientation of the imaging devices), and the operational features available to such imaging devices (e.g., panning or tilting mounts, adjustable focal lengths) may also be identified.

At box 650, the imaging devices that were operating at the time of the event of interest and included the location of the event of interest may be forensically determined based on the operating histories of the imaging devices, and the locations of the imaging devices and the event of interest. For example, one or more static or variable models of the fields of view of a plurality of imaging devices as of the time of the event of interest may be generated, and the models of the fields of view and the locations at which the event of interest occurred may be back-projected through a imaging device transformation according to an optical transfer function. Whether any of the fields of view included the event of interest may be determined based on a comparison of the location of the identified at box 620 to the models of the fields of view, according to the optical transfer function.

At box 660, the event of interest may be reconstructed using information that was captured by one or more of the imaging devices at the time of the event of interest, and the process ends. For example, a two-dimensional or three-dimensional model of the location of the event of interest, as of the time of the event of interest, may be generated based at least in part on one or more photogrammetric analyses of images captured by one or more imaging devices, which may be configured to not only identify outlines of objects but also distinguish specific objects within such images.

Accordingly, the systems and methods disclosed herein may be used not only to identify one or more imaging devices, or portions of fields of view (e.g., sets of pixels) of such imaging devices, that may include an object or area of interest therein, and to monitor for information relating to items, conditions, statuses or events associated with such objects or interests in the future, but also to identify one or more imaging devices, or portions of fields of view of such imaging devices, which may have captured information regarding an event of interest that has already occurred. Such imaging devices or portions of fields of view may be identified based on any information that may be known regarding either the event of interest or the relevant imaging devices, including the locations at which the event of interest occurred or the relevant imaging devices are positioned, as well as the operational properties (e.g., orientations, attributes or capacities) of the relevant imaging devices.

Figure 7:
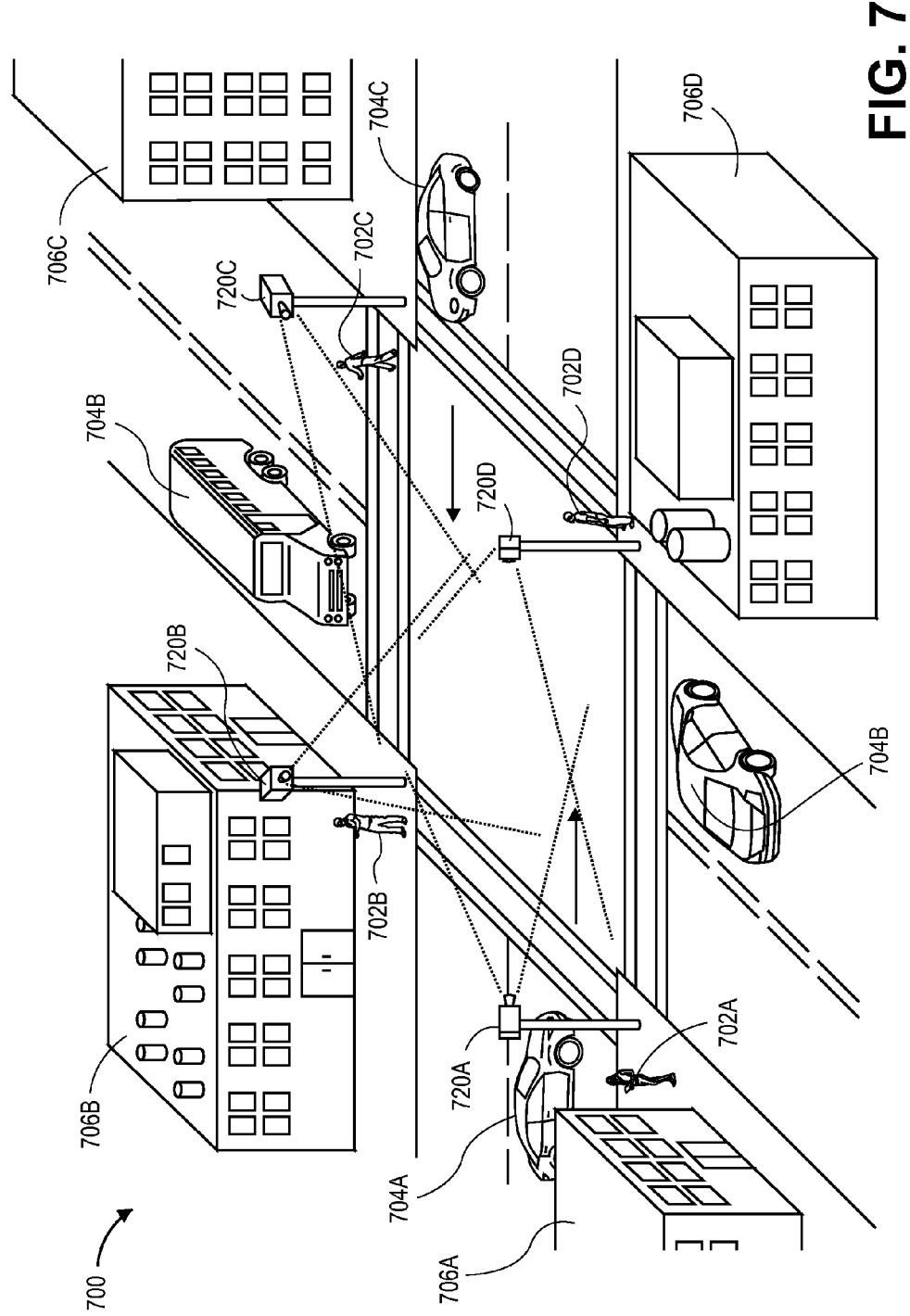
FIG. 7 is a view of one system for automatically selecting imaging devices for video analytics, in accordance with embodiments of the present disclosure.

As is discussed above, the systems and methods disclosed herein may be utilized in any application where a plurality of imaging devices are provided for the purpose of monitoring objects or areas of interest for information relating to items, conditions, statuses or events. Referring to FIG. 7, a system 700 for automatically selecting imaging devices for video analytics in accordance with embodiments of the present disclosure are shown. The system 700 includes a plurality of individuals 702A, 702B, 702C, 702D, a plurality of automobiles 704A, 704B, 704C, 704D and a plurality of facilities 706A, 706B, 706C, 706D, as well as a plurality of imaging devices 720A, 720B, 720C, 720D.

In some embodiments of the present disclosure, the systems and methods may be provided to monitor traffic operations, including the movements of the vehicles 704A, 704C through the intersection during one traffic flow condition, or the movements or operations of the vehicles 704B, 704D during another traffic flow condition. Thus, one or more of the imaging devices 720A, 720B, 720C, 720D may be selected for monitoring such flow conditions, based on the locations and respective operational properties of the respective imaging devices 720A, 720B, 720C, 720D (e.g., the various fields of view, focal lengths and/or orientations of the imaging devices, which may be fixed or variable for each of the imaging devices) and also the locations of the various areas of interest, such as a crosswalk entered by the individual 702C, corners at which the individuals 702A, 702B, 702D are located, as well as the intersection through which the vehicles 704A, 704C are traveling, and at which the vehicles 704B, 704D are stopped, or the buildings 706A, 706B, 706C, 706D. In this regard, one or more of the imaging devices 720A, 720B, 720C, 720D having a most appropriate or advantageous view of the relevant crosswalks, corners, intersection or buildings may be selected. The selected imaging devices may be programmed or otherwise configured to recognize predetermined activity associated with the objects or areas of interest, which may be defined according to one or more triggering events or metrics.

Additionally, where an event of interest (e.g., an automobile collision, a hit-and-run accident or a fire engulfing one or more of the buildings) has occurred, the systems and methods of the present disclosure may further determine whether any of the imaging devices 720A, 720B, 720C, 720D captured information regarding the event of interest, and which of the imaging devices 720A, 720B, 720C, 720D may have provided the highest-quality still or moving images of the event of interest. Such determinations may be based on the locations and respective operational properties of the respective imaging devices 720A, 720B, 720C, 720D (e.g., the various fields of view, focal lengths and/or orientations of the imaging devices, which may be fixed or variable for each of the imaging devices) and also the location of the event of interest.

Although the disclosure has been described herein using exemplary techniques, components, and/or processes for implementing the present disclosure, it should be understood by those skilled in the art that other techniques, components, and/or processes or other combinations and sequences of the techniques, components, and/or processes described herein may be used or performed that achieve the same function(s) and/or result(s) described herein and which are included within the scope of the present disclosure. Additionally, although many of the embodiments described herein or shown in the accompanying figures refer to the use of imaging devices in fixed positions and/or orientations, the systems and methods disclosed herein are not so limited, and may be employed with any form of imaging device, including those imaging devices having adjustable positions, fields of view or orientations, including but not limited to PTZ or ePTZ imaging devices, as well as film based imaging devices. For example, the coverage zones defined in box 530 of FIG. 5 may be expressed in terms of a current location, orientation or focal length of a given imaging device, or an extent of the possible locations, orientations or focal lengths of the given imaging device as functions of time or space. Alternatively, with regard to the operating histories, the locations, the orientations or the capacities of the imaging devices identified at box 640 of FIG. 6, such operating histories, locations, orientations or capacities may be defined with regard to points in time preceding the time at which the event of interest occurred.

It should be understood that, unless otherwise explicitly or implicitly indicated herein, any of the features, characteristics, alternatives or modifications described regarding a particular embodiment herein may also be applied, used, or incorporated with any other embodiment described herein, and that the drawings and detailed description of the present disclosure are intended to cover all modifications, equivalents and alternatives to the various embodiments as defined by the appended claims. Moreover, with respect to the one or more methods or processes of the present disclosure described herein, including but not limited to the flow charts shown in FIGS. 3, 5 and 6, the order in which the boxes or steps of the methods or processes are listed is not intended to be construed as a limitation on the claimed inventions, and any number of the boxes or steps can be combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey in a permissive manner that certain embodiments could include, or have the potential to include, but do not mandate or require, certain features, elements and/or boxes or steps. In a similar manner, terms such as "include," "including" and "includes are generally intended to mean "including, but not limited to." Thus, such conditional language is not generally intended to imply that features, elements and/or boxes or steps are in any way required for one or more embodiments or that one or more embodiments necessarily include logic for deciding, with or without user input or prompting, whether these features, elements and/or boxes or steps are included or are to be performed in any particular embodiment.

Although the invention has been described and illustrated with respect to exemplary embodiments thereof, the foregoing and various other additions and omissions may be made therein and thereto without departing from the spirit and scope of the present disclosure.

What is claimed is:

1. A method comprising:
   identifying an object of interest;
   receiving information regarding at least one triggering metric associated with the object of interest;
   determining a position of the object of interest according to a coordinate system;
   determining positions of each of a plurality of imaging devices according to the coordinate system;
   determining an orientation of each of the plurality of imaging devices;
   modeling, for each of the plurality of imaging devices, a field of view of the imaging device based at least in part on the position of the imaging device and the orientation of the imaging device;
   determining whether the object of interest is within the field of view of at least one of the plurality of imaging devices;
   in response to determining that the object of interest is within the field of view of at least one of the plurality of imaging devices,
   selecting one of the plurality of imaging devices having the object of interest within the field of view; and
   configuring the selected imaging device to monitor the object of interest according to a triggering metric.

2. The method of claim 1, wherein the orientation of each of the plurality of imaging devices comprises an axis of orientation of a lens of the imaging device defined by at least one of a roll angle, a pitch angle or a yaw angle.

3. The method of claim 2, wherein modeling the field of view of the imaging device comprises:
   defining a geometric section in free space according to the coordinate system; and
   determining whether the position of the object of interest is within the geometric section,
   wherein the geometric section is defined based at least in part on the axis of orientation of the lens of the imaging device and the position of the imaging device.

4. The method of claim 3, further comprising:
   determining whether the triggering metric occurred within a field of view of the selected imaging device using the at least one computer processor; and
   in response to determining that the triggering metric occurred within the field of view of the selected imaging device,
   generating at least one signal associated with at least one of the object of interest or the triggering metric.

5. The method of claim 1, wherein configuring the selected imaging device to monitor the object of interest according to the triggering metric comprises:
   determining a location of the object of interest within the field of view of the selected imaging device;
   selecting a plurality of pixels within the field of view of the selected imaging device; and
   configuring the selected imaging device to monitor the selected plurality of pixels within the field of view according to the triggering metric.

6. A non-transitory computer-readable medium having computer-executable instructions stored thereon,
   wherein the instructions, when executed, cause a computer system having at least one computer processor and at least one data store to perform a method comprising:
   identifying information regarding positions of a plurality of imaging devices;
   identifying information regarding orientations of the plurality of imaging devices;
   identifying information regarding at least one of an object or an area of interest, wherein the information comprises a position of the object or the area of interest;
   modeling, for each of the plurality of imaging devices, a field of view of the imaging device based at least in part on the position of the imaging device and the orientation of the imaging device using the at least one computer processor;
   determining, for each of the plurality of imaging devices, whether the object or the area of interest appears within the field of view of at least one imaging device; and
   in response to determining that the object or the area of interest appears within the field of the at least one imaging device,
   storing an association between the object or the area of interest and the at least one imaging device in which the object or the area of interest appears within the field of view in at least one data store.

7. The non-transitory computer-readable medium of claim 6, wherein each of the positions of the plurality of imaging devices is defined by a set of coordinates according to a coordinate system, and
   wherein the position of the object or the area of interest is defined by a set of coordinates according to the coordinate system.

8. The non-transitory computer-readable medium of claim 7, wherein the information regarding the orientations of the plurality of imaging devices comprises an angle of view of a lens of the imaging device and an axis of orientation of the imaging device defined by at least one of a roll angle, a pitch angle or a yaw angle.

9. The non-transitory computer-readable medium of claim 8, wherein modeling the field of view of the imaging device comprises:
   defining a geometric section in free space based at least in part on the position of the imaging device and the angle of view of the lens of the imaging device according to the coordinate system using the at least one computer processor.

10. The non-transitory computer-readable medium of claim 9, wherein determining, for each of the plurality of imaging devices, whether the object or the area of interest appears within the field of view of the at least one imaging device comprises:
   determining whether the set of coordinates defining the object or the area of interest is within the geometric section.

11. The non-transitory computer-readable medium of claim 10, wherein the geometric section is a substantially pyramidal section having an origin associated with the lens of the imaging device.

12. The non-transitory computer-readable medium of claim 9, wherein at least one of the plurality of imaging devices has an adjustable position, an adjustable orientation, or an adjustable focal length, and
   wherein the method further comprises:
      identifying an adjustment to one of the adjustable position, the adjustable orientation or the adjustable focal length using the at least one computer processor,
      wherein the adjustment causes the object or the area of interest to appear within the field of view of the at least one imaging device.

13. The non-transitory computer-readable medium of claim 12, wherein the adjustable orientation comprises at least one of an adjustable roll angle of rotation, an adjustable pitch angle of rotation or an adjustable yaw angle of rotation.

14. The non-transitory computer-readable medium of claim 6,
   wherein the object or the area of interest appears within the field of view of at least two imaging devices, and
   wherein the method further comprises:
      determining a number of pixels covering an aspect of the object or the area of interest within the field of view of the at least two imaging devices using the at least one computer processor;
      determining locations of the pixels covering the aspect of the object or the area of interest within the field of view of the at least two imaging devices; and
      selecting one of the at least two imaging devices for monitoring the object or the area of interest based at least in part on the number of the pixels or the locations of the pixels within the field of view of the at least two imaging devices.

15. The non-transitory computer-readable medium of claim 14, wherein the number of the pixels or the locations of the pixels are determined according to an optical transfer function of the imaging device.

16. The non-transitory computer-readable medium of claim 6, wherein the method further comprises:
   capturing images of the object or the area of interest using the selected imaging device.

17. The non-transitory computer-readable medium of claim 16, wherein the method further comprises:
   determining locations of pixels covering an aspect of the object or the area of interest within the field of view of the selected imaging device; and
   initiating video analytics of the images of the object or the area of interest captured by the selected imaging device based at least in part on the locations of the pixels using the at least one computer processor.

18. The non-transitory computer-readable medium of claim 16, wherein the method further comprises:
   receiving information regarding at least one triggering metric;
   determining whether the at least one triggering metric has been satisfied within at least one of the images of the object or the area of interest captured by the selected imaging device; and
   in response to determining that the at least one triggering metric has been satisfied,
   generating at least one signal associated with an alert using the at least one computer processor.

19. The non-transitory computer-readable medium of claim 6, wherein the method further comprises
   processing at least one of the captured images to recognize at least one of an outline, a movement or a figure associated with the object or the area of interest using the at least one computer processor.

20. A monitoring system comprising:
   a plurality of imaging devices; and
   a computing device in communication with at least one of the plurality of imaging devices,
   wherein the computing device is configured to implement one or more services, and
   wherein the one or more services are configured to:
   identify a position of an event of interest, wherein the event of interest occurred at a given time;
   identify operational characteristics of each of the plurality of imaging devices at the given time;
   identify a field of view for each of the plurality of imaging devices at the given time; and
   determine whether the field of view of at least one of the plurality of imaging devices included the position of the event of interest at the given time based at least in part on the operational characteristics of each of the plurality of imaging devices at the given time.

21. The monitoring system of claim 20, wherein the operational characteristics of at least one of the plurality of imaging devices comprise:
   a position of the at least one imaging device;
   a roll angle of the at least one imaging device;
   a pitch angle of the at least one imaging device;
   a yaw angle of the at least one imaging device; or
   a focal length of the at least one imaging device.

22. The monitoring system of claim 20, wherein the one or more services are further configured to:
   determine, for each of the plurality of imaging devices, a geometric model of the field of view of the imaging device according to a coordinate system, wherein the geometric model is based at least in part on the operational characteristics of the imaging device;
   identify a set of coordinates associated with the position of the event of interest according to the coordinate system; and
   determine, for each of the plurality of imaging devices, whether the set of coordinates associated with the position of the event of interest is within the geometric model of the field of view of the imaging device.

\* \* \* \* \*